United States Patent [19]

De Witt et al.

[11] Patent Number: 4,566,714
[45] Date of Patent: * Jan. 28, 1986

[54] UNIVERSAL CHASSIS FOR HAULING CONTAINERS

[75] Inventors: Nick De Witt, Portola Valley; Lindsey C. Greene, Foster City, both of Calif.

[73] Assignee: X-Ten Corporation, San Francisco, Calif.

[*] Notice: The portion of the term of this patent subsequent to Dec. 31, 2002 has been disclaimed.

[21] Appl. No.: 529,073

[22] Filed: Sep. 2, 1983

Related U.S. Application Data

[63] Continuation-in-part of Ser. No. 491,142, May 3, 1983.

[51] Int. Cl.$^4$ .............................................. B62D 53/06
[52] U.S. Cl. .................................. 280/404; 280/142; 280/656
[58] Field of Search ............... 280/656, 142, 786, 404, 280/789; 410/68, 80, 81; 180/209, 24.02; 403/108, 328; 296/181, 182; 362/80, 83

[56] References Cited

U.S. PATENT DOCUMENTS

| | | | |
|---|---|---|---|
| 2,119,800 | 6/1938 | Tull | 280/789 |
| 2,413,910 | 1/1947 | Diard | 362/80 |
| 2,452,358 | 10/1948 | Long et al. | 280/142 |
| 2,631,885 | 3/1953 | Ault | 410/81 |
| 2,657,939 | 11/1953 | Beebe | 280/656 |
| 2,856,087 | 10/1958 | Steber | 280/656 |
| 2,900,194 | 8/1959 | Delay | 280/656 |
| 3,348,711 | 10/1967 | Gove | 280/656 X |
| 3,451,573 | 6/1969 | Josephian | 296/182 |
| 3,486,787 | 12/1969 | Campbell | 410/80 |
| 3,508,762 | 4/1970 | Pratt | 280/656 |
| 3,552,325 | 1/1971 | Enochian | 410/81 |
| 3,747,788 | 7/1973 | Petetin | 280/656 |
| 4,080,080 | 3/1978 | Cisler | 403/108 |
| 4,169,611 | 10/1979 | Smith et al. | 280/482 |

FOREIGN PATENT DOCUMENTS

| | | | |
|---|---|---|---|
| 1561208 | 2/1969 | France | 280/656 |
| 2264705 | 10/1975 | France | 280/656 |

Primary Examiner—John A. Pekar
Assistant Examiner—Mark C. Dukes
Attorney, Agent, or Firm—Townsend and Townsend

[57] ABSTRACT

A universal shipping container chassis is disclosed wherein shipping containers of various lengths can be readily accommodated and securely held thereto for transit. A rear wheel assembly includes a load-bearing portion adapted to securely receive and support one end portion of a shipping container; a fifth wheel assembly also includes a load-bearing portion which is adapted to securely receive and support a second end portion of said shipping container. The fifth wheel assembly is coupled to a truck tractor such that the chassis may be readily towed. The wheel assemblies are coupled one to the other by an elongate extensible stinger that is readily adjusted in extent to bring the wheel assemblies closer together for shorter containers and to space the wheel assemblies further apart for longer containers. The stinger includes a locking mechanism for securing it to the wheel assemblies at locations thereby providing a selected extension of the stinger that corresponds to the shipping container's length.

3 Claims, 11 Drawing Figures

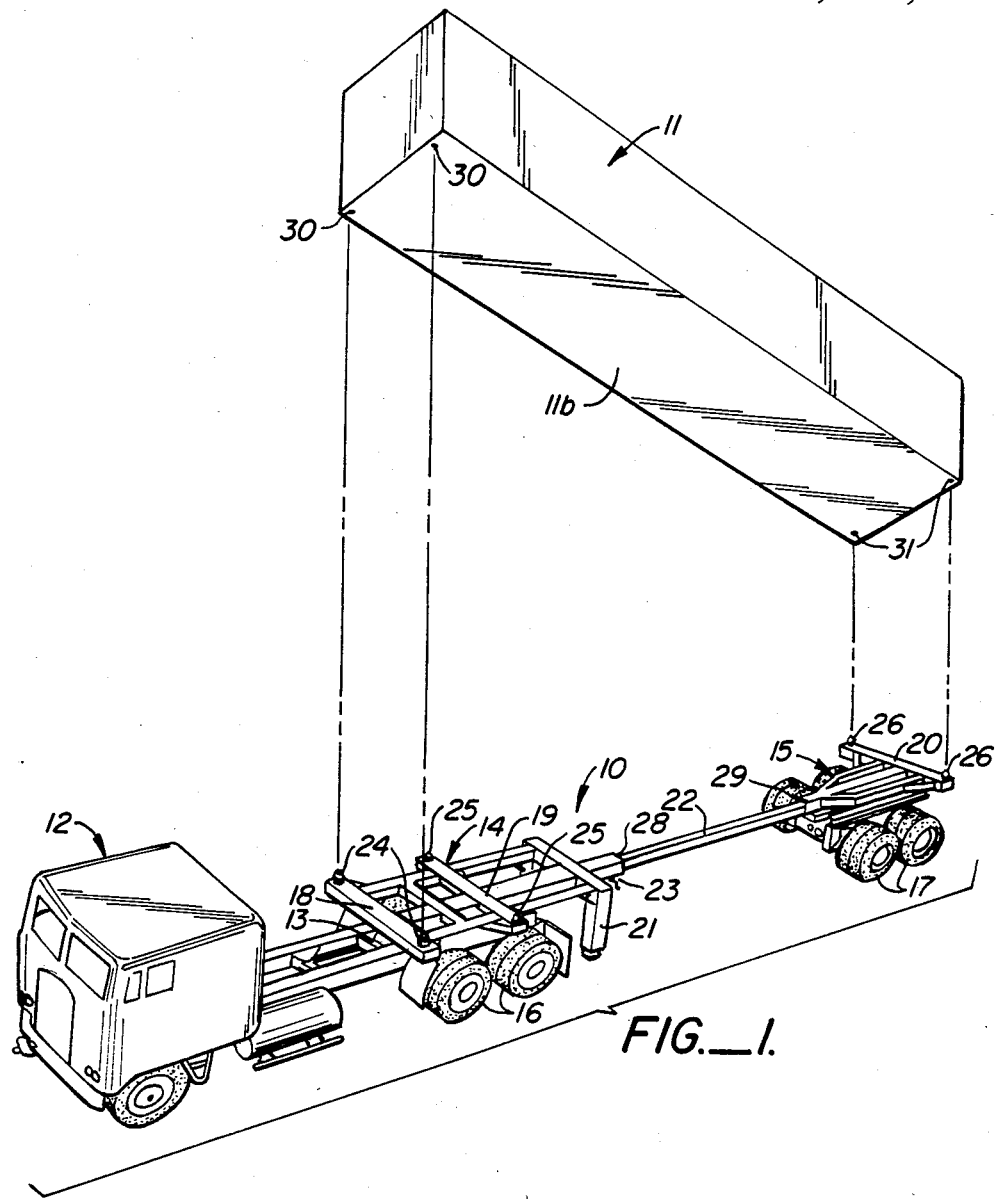
FIG._1.
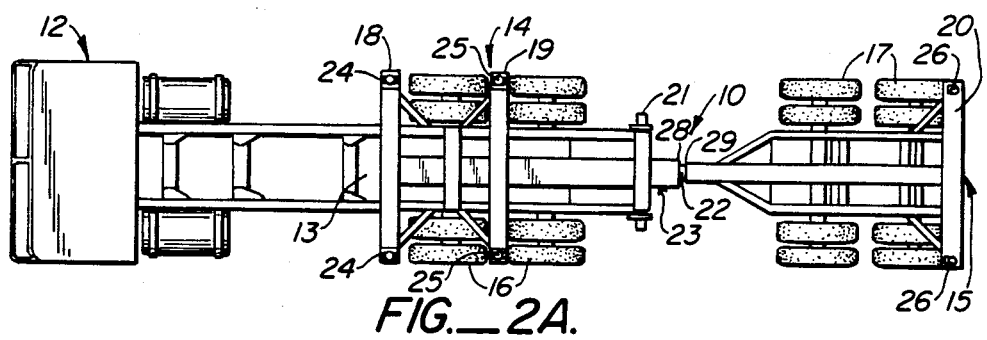
FIG._2A.

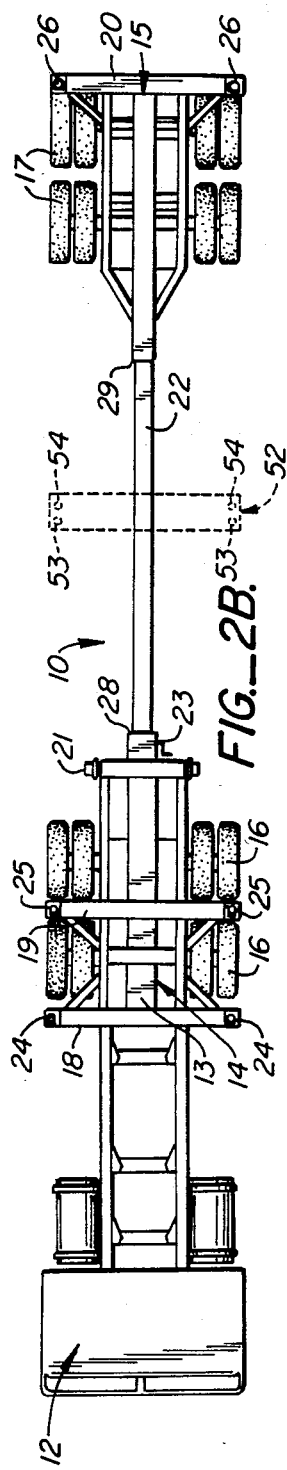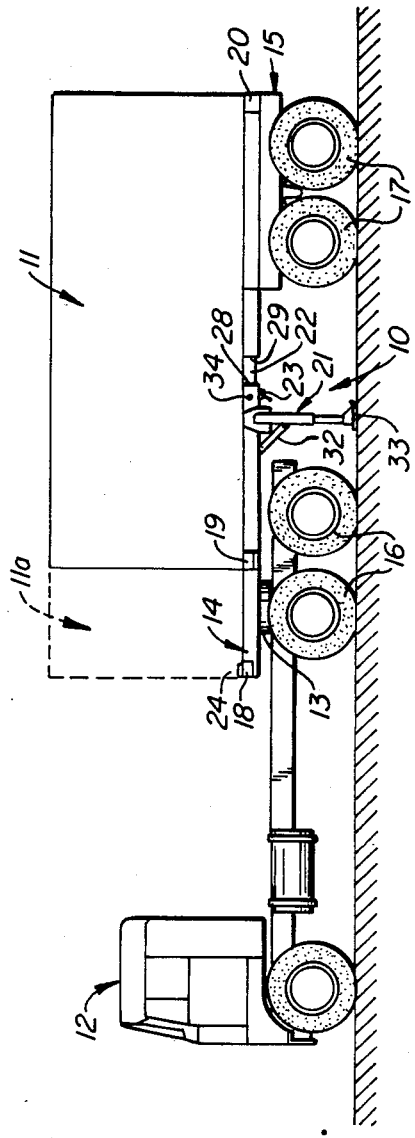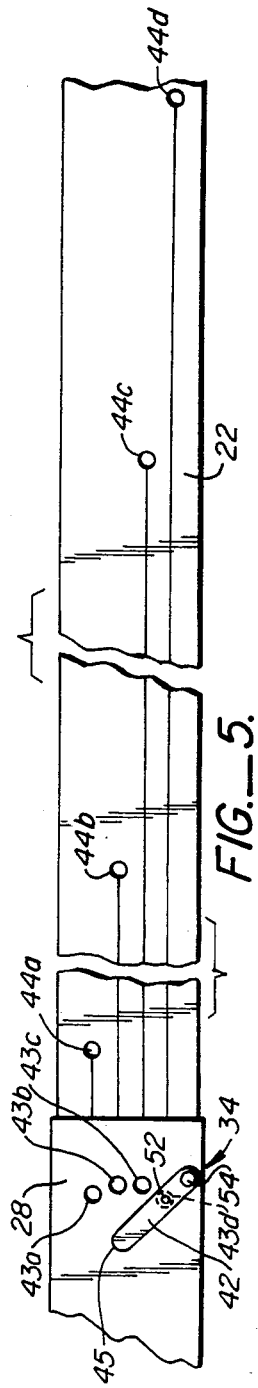

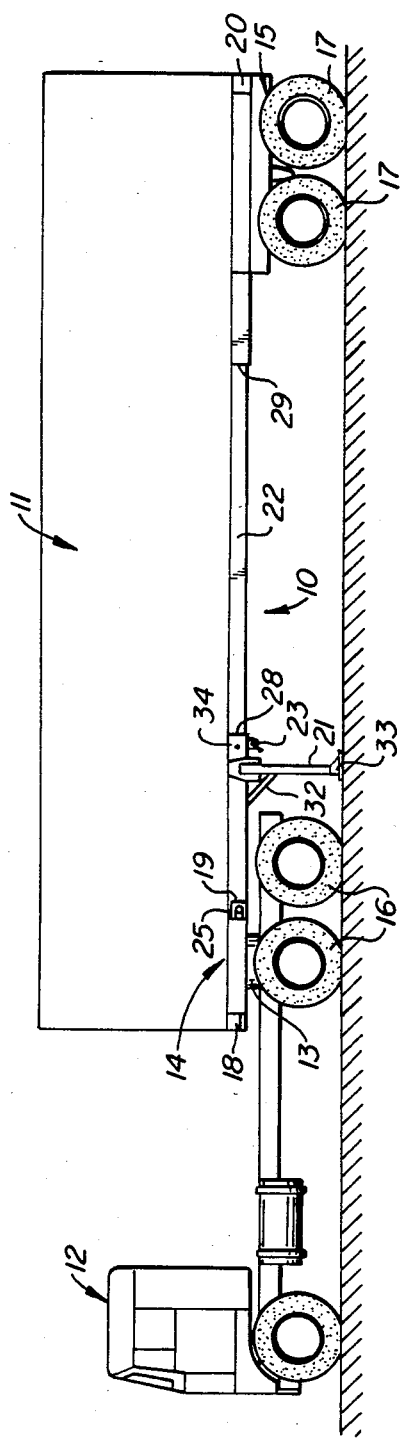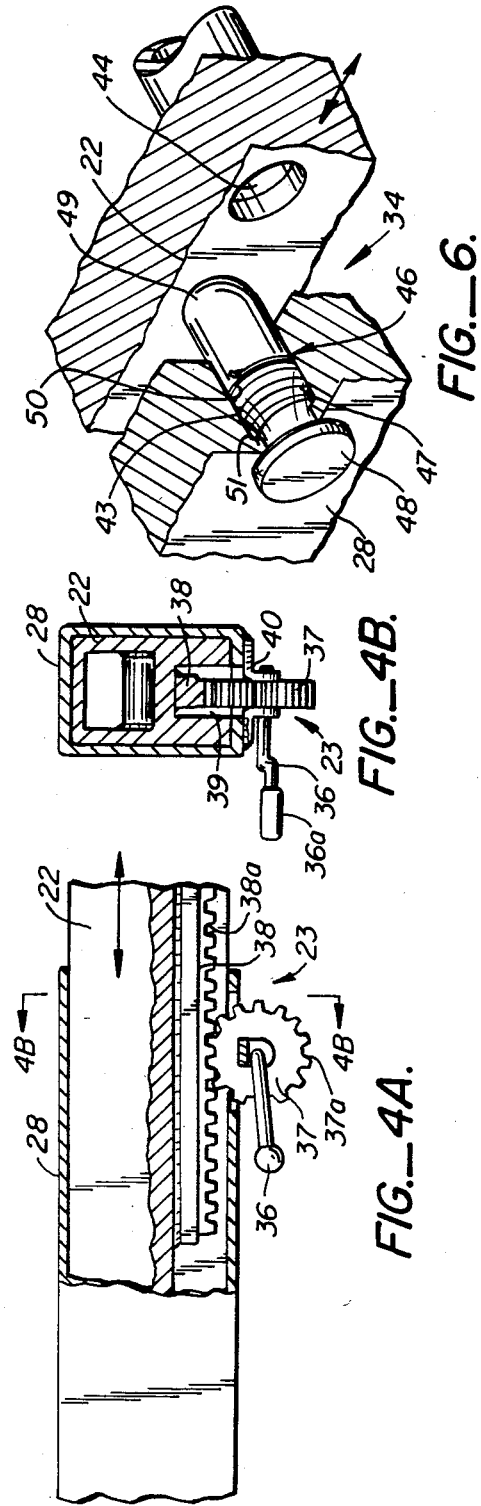

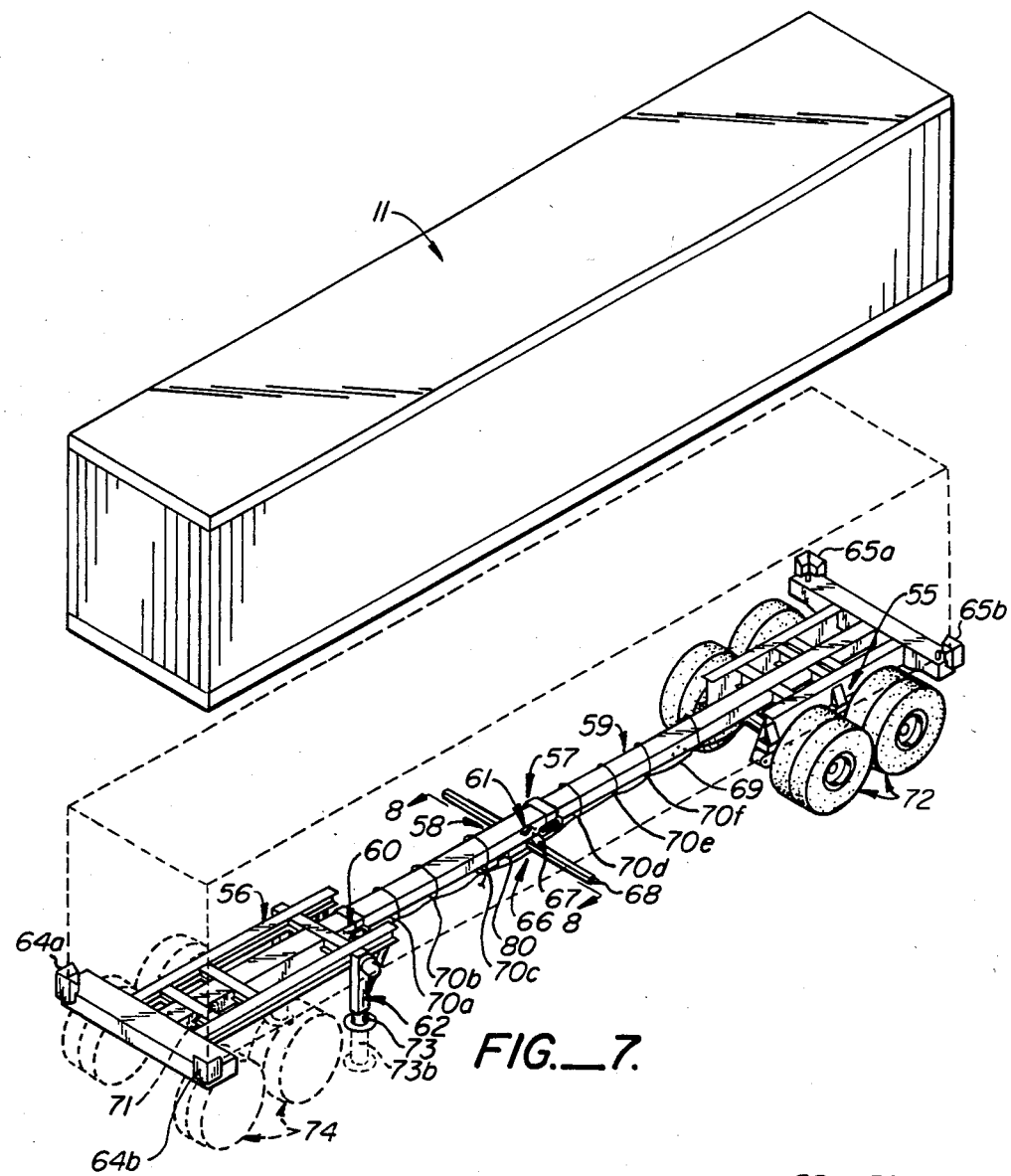
FIG._7.
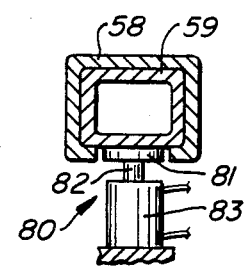
FIG._8.

UNIVERSAL CHASSIS FOR HAULING CONTAINERS

This is a continuation-in-part of copending patent application Ser. No. 491,142, filed May 3, 1983.

BACKGROUND OF THE INVENTION

1. Field of the Invention

The present invention relates to the shipping and transportation of goods in containers by truck. More particularly, the present invention relates to an adjustable truck trailer chassis that may accommodate shipping containers of various lengths.

2. Description of the Prior Art

The use of shipping containers has revolutionized the transport of freight. Goods are now placed in standardized shipping containers and transported from an origin point to a destination point by any of the common commercial transport means, such as ship, rail, or truck. In the course of transit, the containers can be carried by any combination of these transport means. Thus, a container may be routed from a factory to a train terminal or shipping dock by truck, removed from the truck and placed on a railroad flatcar or into a ship's cargo hold, transported to a destination point, and then placed on another truck for distribution.

To transport containers by truck is a simple matter of placing a container onto an appropriate container chassis and securing the container to the chassis by means of industry standard locking bolts. Because the containers are readily fastened to and removed from a truck chassis, handling is fast, efficient, and inexpensive. A further advantage of containers, as opposed to open packaging, such as pallets and boxes, is that valuable goods securely packed in a container are not subject to excessive handling, which may damage the goods. Sealing the containers at point of origin significantly reduces pilferage, vandalism, or theft of the goods contained therein.

Shipping containers are generally available in various sizes from 20–48 feet in length. For transport by truck, each container requires a container chassis of corresponding length. Thus, a 20-foot container requires a 20-foot chassis, a 23-foot container requires a 23-foot chassis, and so on. For a trucking concern to handle all sizes of containers, it is necessary that the concern maintain an inventory of chassis corresponding to the commonly used containers. The chassis inventory is often idle because at any given time, the distribution of various lengths of containers transported to various lengths of chassis in inventory does not bear a one-to-one correspondence. As a result, a moderately expensive capital asset (the chassis) lies idle a portion of the time.

Another problem with prior art container chassis occurs when a trucking concern must accommodate large shipments of several containers having the same size. The trucking concern may maintain a limited inventory of any particular chassis size. Large shipments of one size of containers may readily exhaust this inventory, resulting in lost business due to the concern's inability to accommodate the entire shipment of containers.

Finally, it is desirable to pick up additional containers at or near the point of delivery of a previous container load. Thus, the return chassis trip becomes a profit generating trip rather than an idle equipment return trip. Unfortunately, the return load may not be a container of the same size as that delivered with the non-empty chassis. Thus, an empty chassis of the proper size must be sent to fetch the container while an idle empty chassis of the wrong size is returned to the trucking concern's yard or facility. This is a significant waste of the concern's capital equipment resources and personnel time.

Larger containers, such as those of 40 feet in length, require a very large container chassis. Handling such chassis in congested urban traffic is slow, tedious, and fraught with peril. Returning an empty 40-foot chassis is just as difficult as handling a loaded 40-foot chassis. Actually, an empty chassis is even more difficult to handle because the driver cannot readily see the back end of the chassis as well in the absence of a container thereon.

SUMMARY OF THE INVENTION

The present invention provides a universal shipping container chassis capable of transporting containers of all sizes. Because the present invention is able to accommodate shipping containers of all sizes, a shipping concern's inventory of chassis need not lie idle for a portion of the time. Thus, the shipping concern can maintain full use of all equipment. In the event of a large demand for any particular size chassis, the concern can readily provide those sizes to the limit of its equipment resources. Additionally, a trucking concern need not return an empty chassis to its facility or yard because the chassis did not happen to fit a container available for transport from a previous container delivery point. In this way, idle chassis road time is eliminated. Finally, a long container chassis may be collapsed to a more readily handled length for a return trip thereby reducing or eliminating transportation perils.

The present invention includes a rear wheel assembly having a load-bearing platform portion adapted to securely receive and support one end portion of a shipping container. The platform portion is produced including industry standard upwardly projecting bolts that are operable to engage within corresponding sockets in a bottom portion of the container to be secured to the chassis. The bolts are also operable to lock the container to the platform.

A fifth wheel assembly is provided by which the chassis is coupled to a tractor truck for towing. The fifth wheel assembly includes a load-bearing platform portion adapted to securely receive and support a second end portion of the shipping container. As with the rear wheel assembly, the fifth wheel assembly has upwardly projecting industry standard bolts for securely locking the container to the chassis at the fifth wheel portion thereof. The fifth wheel assembly also includes a retractable landing gear that may be operated between an extended position, wherein the chassis is supported by the landing gear, and a retracted position, wherein the chassis is supported by the fifth wheel portion of the tractor truck for towing.

The universal adjustability of the present invention that allows a single chassis to accommodate containers of various sizes is a function of an elongate extensible stinger which adjustably couples the rear wheel assembly to the fifth wheel assembly with a selected spacing therebetween that corresponds to a desired chassis length. As used in this description and the appended claims, the term "stinger" shall refer to a beam used to connect the fifth wheel assembly to the rear wheel assembly. In this way, shipping containers of different lengths are readily accommodated by the chassis by the amount of spacing of the rear wheel assembly from the fifth wheel assembly accorded by the extended length of the stinger.

The present invention also provides a locking mechanism for securing the stinger to the fifth wheel assembly and the rear wheel assembly at extended lengths that correspond to a selected shipping container length. In one embodiment of the invention, the locking mechanism includes an elongate, inwardly biased pin associated with one or both of the wheel assemblies and operable for selected engagement with spaced apertures that are located along the stinger at positions that correspond to the various shipping container lengths.

In operation, another embodiment of the invention allows setting of the chassis length as follows: The chassis is coupled to a truck tractor. The locking mechanism securing the stinger to the wheel assembly is released. The rear wheels are locked by applying the rear wheel brakes. The truck tractor is driven away from the rear wheel assembly to lengthen the chassis or backed toward the rear wheel assembly to shorten the chassis. When a desired chassis length is obtained, the locking mechanism is reinserted to secure the wheel assemblies to the stinger.

Yet another embodiment of the invention provides a rack and pinion mechanism, wherein the length of the chassis is adjusted by movement of a pinion that accordingly pushes or draws a rack associated with the stinger. The rack and pinion may be operated by hand crank or by any of a number of power assist means, such as electric, hydraulic, or pneumatic engines.

An additional feature of the present invention is the inclusion of gathering surfaces or pockets at each corner portion of the chassis and proximate to the locking bolts. When a container is placed on the chassis, the gathering surfaces serve to guide and otherwise direct bottom surface corners of the container into engagement with the locking bolts. Accordingly, sure and ready engagement of the container with the chassis is provided.

It will be appreciated that containers carried by the present invention are of a rigid construction. The present invention exploits the rigid property of the container to minimize the gauge of materials from which the extensible stinger portion of the present invention is constructed and accordingly reduces overall chassis weight. The load bearing platform portion of the rear wheel and fifth wheel assemblies bear the total weight of the container placed on the chassis. Rigidity between the rear wheel and fifth wheel assemblies is provided by the rigidity of the container itself. Thus, the chassis and the container in concert provide a uniform rigid container/chassis assembly.

Eliminating the need for stinger rigidity allows the stinger to be formed in a plurality of sections. As a result, the rear wheel and fifth wheel assemblies may be more easily adjusted, one in relation to the other, to readily allow the chassis to accommodate various size containers. Because the container and chassis are unitary, stress and torsion are not transmitted to the stinger and wear is thus minimized. It is a result of this novel arrangement that the useful life of the chassis is significantly extended while maintenance, operation, and transportation costs are significantly reduced.

BRIEF DESCRIPTION OF THE FIGURES

FIG. 1 is a perspective view of the present invention showing a tractor truck coupled to the fifth wheel of the invention showing the invention configured to receive a shipping container;

FIG. 2a is a top plan view of the present invention wherein an extendible stinger portion of the invention is fully retracted;

FIG. 2b is a top plan view of the present invention wherein the extendible stinger portion of the invention is in an extended position;

FIG. 3a is a side elevational view of the present invention showing the invention configured for a small container and showing in phantom a large container;

FIG. 3b is a side elevational view of the present invention showing the invention configured for a long container;

FIG. 4a is a partially sectioned side elevational view of a rack and pinion arrangement for adjusting the amount of stinger extension;

FIG. 4b is a section view taken along lines 4b—4b in FIG. 4a showing the rack and pinion arrangement;

FIG. 5 is a side elevational view of a stinger positioning and locking arrangement;

FIG. 6 is a partially sectioned perspective view of a pin for selectably locking the extendible stinger at a desired location;

FIG. 7 is a perspective view of an alternate embodiment of the present invention showing a multisection elongated stinger for separating a rear wheel assembly from a fifth wheel assembly; and FIG. 8 is a cross-sectional view of the alternate embodiment of the invention taken along line 8—8 in FIG. 7.

DETAILED DESCRIPTION OF A PREFERRED AND ALTERNATE EMBODIMENT

The present invention provides a universal shipping container chassis for accommodating shipping containers of various lengths. FIG. 1 shows the chassis 10 in perspective and configured for towing by a truck tractor 12. A standard shipping container 11 is shown above and ready for mounting to chassis 10.

The present invention includes a fifth wheel assembly 14 connected to a rear wheel assembly 15 by an extendible stinger 22. Fifth wheel assembly 15 is coupled to truck tractor 12 at fifth wheel 13. Such fifth wheel arrangements are well known in the art and have become a standard in the trucking industry.

Fifth wheel assembly 14 rests on truck tractor rear wheels 16 when the chassis is configured to be towed to thereby transport a container. The fifth wheel assembly may also be supported by a retractable landing gear 21.

Rear wheel assembly 15 receives a rear portion of container 11 and includes wheels 17 upon which the container and assembly rides. Spacing of the fifth wheel assembly from the rear wheel assembly is a function of the extent of extendible stinger 22. The stinger is complementary to and fits within channels 28 and 29 of the fifth wheel and rear wheel assemblies, respectively. An adjusting device 23 is provided for drawing the stinger into channel 28 or removing therefrom. In this way, the spacing between the fifth wheel assembly and rear wheel assembly can be changed thereby allowing the chassis to accommodate containers of various sizes. In other embodiments of the invention a similar adjusting device is included on channel 29 to correspondingly draw the stinger into and withdraw the stinger from the channel.

Container 11 is of an industry standard type and includes front mounting sockets 30 and rear mounting sockets 31 that are configured for engagement with complementary pins located on the fifth wheel and rear wheel assemblies. The fifth wheel assembly includes cross members 18 and 19 having pins 24 and 25 attached thereto; the rear wheel assembly includes cross member 20 having pins 26 attached thereto. The present invention accommodates various sizes of containers according to the extension of stinger 22 and, in this embodiment of the invention, also according to the location of the front container pins in locking engagement with the pins on cross member 18 (pins 24) or cross member 19 (pins 25). Such arrangement is explained more fully below in the discussion of FIG. 3a.

FIG. 2a is a top plan view of the present invention showing stinger 22 retracted within channel members 28 and 29. Such a configuration is typical for trailers of between 20 and 24 feet in length. It can be seen from FIGS. 1 and 2a that pins 24–26 are of an industry standard type for use with such industry standard containers. The pins, once engaged with the complementary container sockets, are operable to securely lock the container to the chassis for safe transport from point of origin to point of destination.

FIG. 2b is a top plan view of the present invention showing stinger 22 extended from channels 28 and 29. Such arrangement is typically applicable for containers up to 40 feet in length. Operation of the invention is clearly seen when comparing FIG. 2a (stinger 22 retracted) with FIG. 2b (stinger 22 extended). FIGS. 3a and 3b likewise show in side elevational format the retracted (FIG. 3a) and extended (FIG. 3b) configurations of the present invention.

FIG. 3a is a side elevational view of the present invention showing a 20-foot container 11 mounted to chassis 10 and showing in phantom a 23-foot container 11a mounted to said chassis. The Fig. additionally shows landing gear 20 in more detail including a supporting strut 32 and a landing gear footing 33. Such landing gear arrangements are well known for standard trucking equipment. When the chassis and/or container are not towed by tractor truck 12 such that tractor truck rear wheels 16 do not support the fifth wheel assembly portion of chassis 10, the landing gear provides support in its stead.

It can be clearly seen from both FIGS. 3a and 3b that the fifth wheel assembly and the rear wheel assembly provide a coplanar upper surface corresponding to the flat bottom surface 11b of the container. The present invention provides a flat, horizontal planar region extending from the fifth wheel rearwardly. In this way, the present invention provides a simplified chassis which departs from typical "goose-neck" container chassis arrangements.

FIG. 3a also shows a locking mechanism 34 for securing the stinger at a selected extent corresponding to that necessary for the length of container being transported. Locking device 34 is discussed in more detail below. It should be noted in FIG. 3a that for containers of the 20-foot size (11) and 23-foot size (11a) stinger 22 is in its minimum extended position. For this reason, cross members 18 and 19 are provided cross member 18 for 23-foot containers and cross member 19 for 20-foot containers. Such arrangement is desirable in the embodiment of this invention to maintain an even distribution of container weight over the container supporting wheels 16/17.

Although the present invention is intended to carry shipping containers of all lengths, it is possible to carry more than one shipping container with the present invention. Such alternate embodiment is shown in phantom in FIG. 2b wherein cross member 52 is shown including two sets of pins 53 and 54 by which pins 54 receive the front socket portion from the front end of a first container and pins 53 receive the rear socket portion of the rear end of another container.

FIG. 3b shows the present invention configured for transporting a 40-foot chassis. Typically, the present invention requires adjustable extension of stinger 22 for all containers greater than 23-feet in length. As shown in FIG. 3b, a 40-foot container spans from cross member 20 to cross member 18, thereby covering cross member 19. To prevent interference with the bottom of container 11 when spanning cross member 19, pins 25 mounted to cross member 19 are of a hinged or retractable type well known in the industry. In this way, a large container of up to 40 feet may be placed covering cross member 19 and yet pins 25 are retracted out of the way so as to prevent interference with the secure mounting of the container to the chassis at pins 24 and 26 located on cross members 18 and 19, respectively.

Adjusting mechanism 23 is shown in more detail in FIGS. 4a and 4b. A crank 36 is shown coupled to a pinion 37 including a set of pinion teeth 37a which engage within rack 38 and are complementary to rack teeth 38a. Accordingly, cranking motion of crank 36 draws stinger 22 into channel 28 or pushes stinger 22 out from channel 28. In this way, the spacing between the fifth wheel assembly and rear wheel assembly is readily adjusted.

A hand crank 36a is shown as a portion of crank 36 in FIG. 4b, which is a cross-sectional view of the rack and pinion assembly. It can be seen in FIG. 4b that channel 28 is formed as a void within a bolster-like member into which stinger 22 firmly and snugly, yet movably, fits. A track portion 39 is included for receiving and mounting rack 38. Crank and pinion assembly 36/37 are held to channel member 28 by a bracket 40. Although a hand crank is shown as the adjusting means in this embodiment of the invention, other such engines may be provided. For example, a hydraulic, pneumatic, or electric motor can be provided for extending and retracting stinger 22. Additionally, adjusting mechanism 23 can be provided at both the fifth wheel assembly and the rear wheel assembly, or it can be provided at either assembly as is suited for the application to which the present invention is put. The adjusting assembly can also be dispensed with altogether in some embodiments of the invention. Thus, rather than cranking the stinger to the desired amount of extension for the container to be carried, the truck driver applies the truck brakes at rear wheel 17, releases locking means 34, and either backs truck tractor 12 or moves truck tractor 12 forward to accordingly move the fifth wheel and rear wheel assemblies closer together or further apart as desired.

Two embodiments of locking assembly 34 are shown in more detail in FIGS. 5 and 6. Referring to FIG. 5, stinger 22 is shown including a plurality of staggered apertures 44b–44d, said apertures being vertically spaced from each other and being located at spaced horizontal position along stinger 22. Each of said apertures is located at a position corresponding to a standard amount of extension, e.g. for 30-foot containers, 35-foot containers, 40-foot containers.

A pivotable arm 42 is shown mounted to channel member 28 at a pivoting end 45 and having a pin 52 for engaging apertures 43a–43d in channel member 28.

Arm 42 is shown having a handle 54 which can be used to move arm 42 from one position to another. Alternatively, pin 52 could be grasped to move arm 42, and pin 52 could have a handle attached to facilitate grasping. Such a handle can be attached to pin 52 itself to facilitate pulling the pin out of, and inserting it into apertures 43a–43d. Each of apertures 43a–43d through channel member 28 coincides with a corresponding aperture 44a–44d in stinger 22. Thus, for example, aperture 43b through channel member 28 coincides with aperture 44b through stinger 22 when a certain amount of desired extension is obtained.

In operation, each stinger aperture 44a–44d determines the length of the chassis, which corresponds to the length of the container to be carried. Arm 45 is rotated until pin 52 is in the desired one of apertures 43a–43d corresponding to the desired extension. Stinger 22 is then extended until pin 52 engages the corresponding one of aperture 44a–44d. Although in this embodiment of the invention, a locking means 34 is shown associated with channel member 28, a similar locking means designated 34' in FIG. 3b can also be associated with channel member 29 in addition to or instead of that associated with channel member 28.

FIG. 6 shows a perspective in partial cross-section of a second embodiment with a locking pin inserted through a single aperture 43 in channel member 28 for engagement with a single aperture 44 in stinger 22. Pin 46 includes a knob portion 48 by which the pin may be pulled outwardly to release it from enqagement with aperture 44 and also includes a pin point 49 that engages with aperture 44 to lock stinger 22 in a selected position with channel member 28.

Pin 46 in this embodiment of the invention is biased by a bias member, which may be a spring 47. The spring pushes outwardly against a pin shoulder portion 50 and pushes in an opposite direction against a shoulder portion 51 within aperture 43. In this way, the pin is set to lock into position as aperture 44 moves within alignment about pin point 49. Thus, the stinger automatically locks in position when a desired chassis length is obtained. Although locking means 34 includes pin arrangement 46, other such locking arrangements can be used in the present invention, such as cotter pins, bolts.

An alternative embodiment of the invention is shown in perspective view in FIG. 7. The chassis, shown in perspective, has a rear wheel assembly 55 including wheels 72 and a fifth wheel assembly 56 including a fifth wheel hitch 71. Wheels 74 are shown having the spaced relation to fifth wheel assembly 56 that they would have if a towing tractor were coupled to the chassis.

Fifth wheel assembly 56 also includes a landing gear 62 for supporting the chassis and any container load it is carrying when a towing tractor is not coupled to the chassis. In FIG. 7, landing gear 62 is shown having a support 73a in a retracted position; support 73b (shown in phantom) shows an extended, chassis supporting position of the landing gear.

An elongate extensible stinger 57 is shown having two telescoping sections 58/59. The sections are arranged so that section 58 is readily recessed into fifth wheel assembly 56 as selected by stinger locking control 60. The locking control shown is of the type described above or may be of a similar type but including a hydraulic, pneumatic, or electrically operated release mechanism such that locking mechanism operation may be initiated remotely from the cab of the truck tractor or at any other convenient remote location.

Second stinger section 59 is of lesser dimensions than stinger section 58 and, accordingly, readily telescopes into and out of first stinger section 58 as desired and as controlled by lock mechanism 61. As discussed above for lock mechanism 60, lock mechanism 61 may be of the mechanical type described herein or may be of a power assisted type.

Gathering surfaces 64a/b and 65a/b are provided on fifth wheel assembly 56 and rear wheel assembly 55, respectively. The gathering surfaces or pockets are flared, substantially vertical extensions at the corners of the fifth wheel and rear wheel assemblies and serve to guide a container into proper orientation with the chassis when the container is lowered to the chassis as shown in FIG. 7. Once guided into proper orientation with the chassis, the container is readily fastened thereto by industry standard locking bolts, described above.

A marker light assembly 66 is included fastened to an underside portion of first stinger section 58 and having a light bar 67 and light 68. The light is provided to meet highway department requirements, where applicable. Light assembly 66 is operated by electrical power supplied, along with pressurized air, by cables 69. Power for the backup, rear, and brake lights, and air for the rear wheel assembly brakes are also supplied via cables 69.

The cables are attached to extensible stinger 57 by means of hangers 70a–70f and are arranged in an accordian-like fashion. Accordingly, extending or shortening the chassis length is accomplished without having to lengthen or shorten or otherwise adjust the cables that provide air and electrical power from the truck tractor to the chassis and container assemblies.

The elongated stinger may be provided in any number of sections as is convenient for the type and size range of containers being transported by the extensible chassis. Because the stinger sections telescope into and out of each other, there is a possibility of wear between the stinger sections, resulting from movement between the fifth wheel and rear wheel assemblies. Most of this movement, which consists of various components of stress and torsion, is damped or otherwise absorbed by the container itself. That is, when the container is fitted to the chassis, the chassis/container combination becomes a unitary assembly. The present invention exploits the rigid property of the container to provide a continuously rigid link between the fifth wheel and rear wheel assemblies. The combination of the container and the fifth wheel and rear wheel assemblies carries the full load weight and transmits most transport stress from the fifth wheel assembly to the rear wheel assembly through the container itself. This arrangement eliminates the need for heavy gauge stinger construction and allows the stinger to be formed in a plurality of sections, resulting in a lighter and more easily adjustable chassis.

When a container is not present on the chassis, e.g., when chassis length is adjusted or for chassis transportation, some stress and torsion is present along the stinger and at the telescoping stinger sections. To prevent the development of slack within the stinger due to wear between the stinger sections (or between the stinger and the rear wheel assembly and/or the fifth wheel assembly), the present invention includes a clamp assembly 80 consisting of a clamp plate 81 and a piston 82, powered by a pneumatic, electric, or hydraulic power source 83. It is convenient in the exemplary embodiment of the invention to use a pneumatic power source which can be powered from the tractor truck's air line. However, any source of power, including an electrical device such as a solenoid, can be used to power piston 82.

When the chassis is adjusted to accommodate various size shipping containers, the piston is withdrawn and plate 81 is released, allowing the stinger to be inserted or withdrawn from its associated wheel assembly or telescoping stinger portion. When piston 82 is extended, plate 81 is forced into compressive abutment with a bottom surface of the stinger portion extending into and associated with clamp assembly 80. As a result, the stinger is locked into place within a surrounding portion of its associated wheel assembly or telescoping stinger portion, thus preventing torsional or stress-induced movement of the stinger member within its associated wheel assembly or telescoping stinger portion.

As discussed above, axial movement of the stinger is prevented by locking assemblies 60/61. The present invention provides clamp assembly 80 to take up slack along the stinger between the wheel assemblies. As a result, the life of the chassis is extended by the prevention of sagging at one end or the other of the chassis. This prevents wear and tear on the contact and moving points within the chassis. Prevention of such wear between the wheel assemblies and the stinger is very critical in any chassis which carries containers of the type described herein. If the planar relationship between the fifth wheel assembly and rear wheel assembly were disturbed due to wear, such that one assembly sagged or was out of alignment with another of the assemblies, it would not be possible to properly engage the container with the locking bolts on the chassis. As a result, the chassis would be useless for the transportation of containers. Including clamp assembly 80 in the present invention eliminates sagging and wear along and about the stinger assembly and thus prevents misalignment between the fifth wheel and rear wheel assemblies from occurring.

The foregoing was given for purposes of illustration and example of a preferred embodiment of the present invention. Other equivalent embodiments of the present invention can readily be produced based on the teachings herein. For example, additional cross members can be added to rear wheel assembly 15 in lieu of, or in addition to, those on fifth wheel assembly 14. An additional cross member can be added at a central portion of stinger 22 by which two containers of varying lengths can be accommodated by the present invention. In such instance, the rear wheel assembly is adjusted for spacing from the additional, center cross member so that a container carried on that portion is properly positioned from the rear wheel cross member to the stinger cross member. The spacing between the fifth wheel cross member and the stinger cross member is independently adjusted to accommodate the container placed therebetween. Additional embodiments of the invention can provide devices other than a rack and pinion for adjusting the extent of the stinger or can dispense with adjusting means entirely. Likewise, various types of locking arrangements can be employed. Therefore, the scope of the invention should be limited only by the breadth of the claims.

We claim:

1. A process for adjustably extending a universal shipping container chassis comprising:
   providing a rear wheel assembly including a load bearing portion adapted to securely receive and support a first end portion of a shipping container;
   providing a fifth wheel assembly including a load bearing portion adapted to securely receive and support a second end portion of said shipping container;
   providing an elongate extensible stinger assembly for adjustably coupling said rear wheel assembly to said fifth wheel assembly said stinger including a stinger coupled to one of said rear wheel assembly and said fifth wheel assembly and a tube for receiving said stinger coupled to the other of said rear wheel assembly and said fifth wheel assembly whereby shipping containers of different lengths can be accommodated by said chassis;
   placing in said adjustable stinger a plurality of first apertures, said first apertures being vertically and horizontally spaced from each other;
   placing in said tubes a plurality of second apertures, said second apertures being spaced vertically to correspond to the vertical spacings of said first aperture;
   registering a pin for engaging one of said first apertures and one of said second apertures;
   locking said rear wheel assembly;
   moving said fifth wheel assembly towards and away from said locked rear wheel assembly until said pin engages one of said first apertures and one of said second apertures to provide a selected extension of said stinger assembly corresponding to a shipping container's length.

2. The method of claim 1 including providing an arm coupled to said pin for providing selective engagement with said second apertures and moving said arm with said pin to engage said selected apertures.

3. The invention of claim 1 and including the step of spring biasing said pin toward said second aperture onto said stinger whereby when said first aperture registers with said second aperture said container is locked.

* * * * *